United States Patent
Bennett et al.

(10) Patent No.: US 11,416,161 B2
(45) Date of Patent: Aug. 16, 2022

(54) ZONE FORMATION FOR ZONED NAMESPACES

(71) Applicant: Western Digital Technologies, Inc., San Jose, CA (US)

(72) Inventors: Alan D. Bennett, Edinburgh (GB); Liam Parker, Edinburgh (GB); Daniel L. Helmick, Broomfield, CO (US); Sergey Anatolievich Gorobets, Edinburgh (GB); Peter Grayson, Grand Rapids, MI (US)

(73) Assignee: Western Digital Technologies, Inc., San Jose, CA (US)

( * ) Notice: Subject to any disclaimer, the term of this patent is extended or adjusted under 35 U.S.C. 154(b) by 207 days.

(21) Appl. No.: 16/703,646

(22) Filed: Dec. 4, 2019

(65) Prior Publication Data

US 2020/0409589 A1    Dec. 31, 2020

Related U.S. Application Data

(60) Provisional application No. 62/868,785, filed on Jun. 28, 2019.

(51) Int. Cl.
*G06F 3/06* (2006.01)
*G06F 12/02* (2006.01)

(52) U.S. Cl.
CPC ............ *G06F 3/0652* (2013.01); *G06F 3/064* (2013.01); *G06F 3/0608* (2013.01); *G06F 3/0616* (2013.01); *G06F 3/0688* (2013.01)

(58) Field of Classification Search
CPC .... G06F 3/0652; G06F 3/0616; G06F 3/0688; G06F 3/0608; G06F 3/064; G06F 3/0679;

(Continued)

(56) References Cited

U.S. PATENT DOCUMENTS 8,117,381 B2    2/2012  Gonzalez et al.
9,361,222 B2 *  6/2016  Fitzpatrick ............ G06F 11/008
(Continued)

FOREIGN PATENT DOCUMENTS

| KR | 1020080021684 | 3/2008 |
|---|---|---|
| KR | 1020150038308 | 4/2015 |
| KR | 1020190063054 | 6/2019 |

OTHER PUBLICATIONS

"Symphonic Zones—Cooperative Flash Zones." Radian Memory Systems, Product Overview, Feb. 2019, 5 pages, www.radianmemory.com/wp-content/uploads/2019/02/Symphonic_Zones_Product_Overview_v1.pdf.

(Continued)

*Primary Examiner* — Christopher D Birkhimer
(74) *Attorney, Agent, or Firm* — Patterson + Sheridan, LLP; Steven H. VerSteeg

(57) ABSTRACT

The present disclosure generally relates to methods of operating storage devices. The storage device comprises a controller and a media unit. The capacity of the media unit is divided into a plurality of zones. The media unit comprises a plurality of dies, and each of the plurality of dies comprising a plurality of erase blocks. The controller is configured to compare an estimated age of a first available erase block in each of the plurality of dies to one another and select one or more of the first available erase blocks from one or more dies of the plurality of dies based on the estimated ages to form a first zone. At least one first available erase block from at least one die of the plurality of die is excluded from the first zone.

18 Claims, 8 Drawing Sheets

(58) Field of Classification Search
CPC .. G06F 3/0659; G06F 12/0246; G06F 3/0644; G06F 3/0604; G06F 3/061; G06F 3/0649
See application file for complete search history.

(56) References Cited

U.S. PATENT DOCUMENTS

| | | |
|---|---|---|
| 9,665,295 B2 | 5/2017 | Fitzpatrick et al. |
| 2015/0046635 A1* | 2/2015 | Fitzpatrick .......... G06F 12/0246 711/103 |
| 2015/0046664 A1* | 2/2015 | Fitzpatrick ............ G06F 3/0616 711/156 |
| 2018/0373438 A1 | 12/2018 | Bennett et al. |
| 2019/0018788 A1 | 1/2019 | Yoshida et al. |
| 2019/0042150 A1 | 2/2019 | Wells et al. |

OTHER PUBLICATIONS

Korean Patent Application No. 10-2020-0035479, filed Mar. 24, 2020, Notice of Allowance, 5 pages.

* cited by examiner

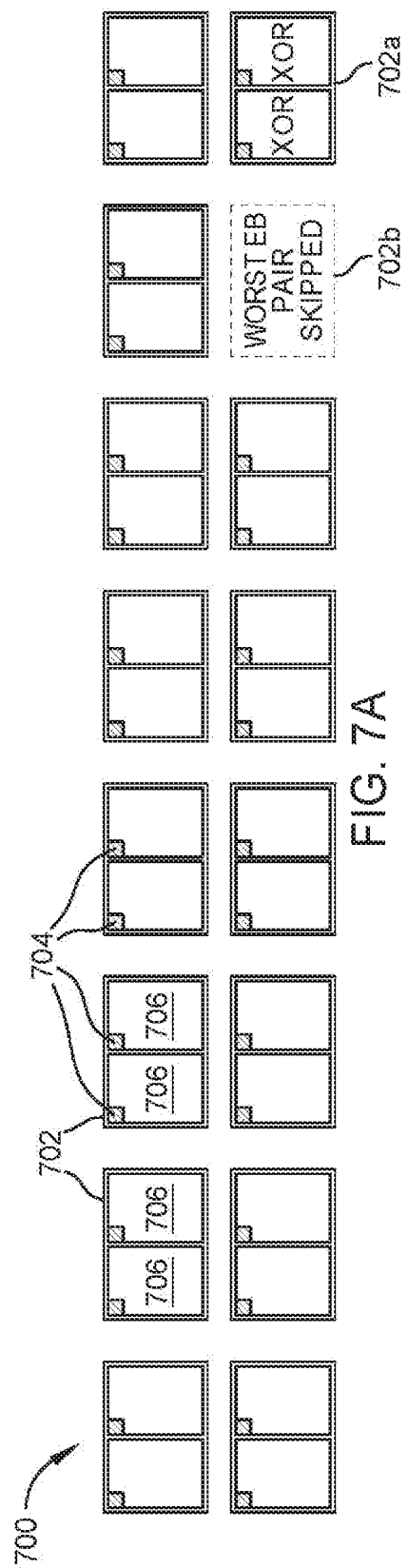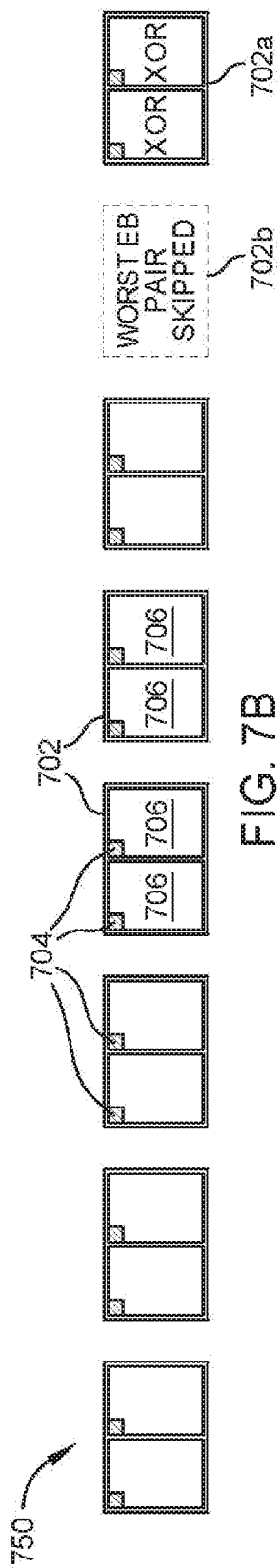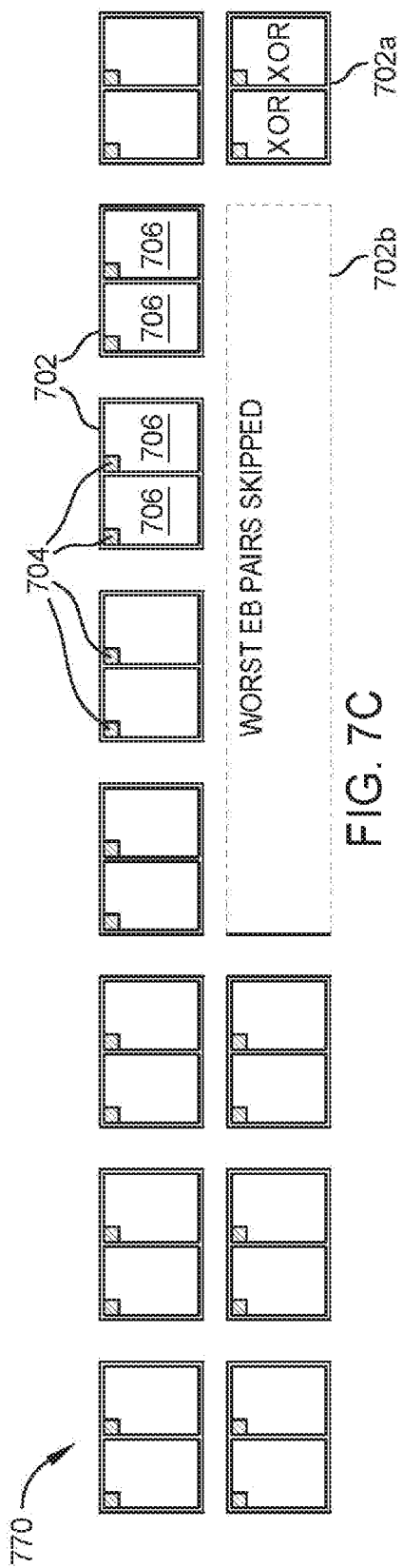

ZONE FORMATION FOR ZONED NAMESPACES

CROSS-REFERENCE TO RELATED APPLICATIONS

This application claims benefit of U.S. Provisional Patent Application Ser. No. 62/868,785, filed Jun. 28, 2019, which is herein incorporated by reference.

BACKGROUND OF THE DISCLOSURE

Field of the Disclosure

Embodiments of the present disclosure generally relate to storage devices, such as sold state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Once data is programmed to one or more erase blocks, the erase block may be erased or cleared, returned to a free pool of erase blocks, and then re-programmed with data again.

However, each program-erase cycle of the erase blocks increases the age and amount of wear on the erase blocks, potentially decreasing the retention ability and endurance of the erase blocks as well as increasing the bit error rate of the data. One or more erase blocks may be selected more often than other erase blocks, which may result in the heavily-used erase blocks becoming unusable, damaged, and/or unavailable for storing data.

Therefore, what is needed is a new method of operating a storage device that mitigates the age and wear of the erase blocks.

SUMMARY OF THE DISCLOSURE

The present disclosure generally relates to methods of operating storage devices. The storage device comprises a controller and a media unit. The capacity of the media unit is divided into a plurality of zones. The media unit comprises a plurality of dies, and each of the plurality of dies comprising a plurality of erase blocks. The controller is configured to compare an estimated age of a first available erase block in each of the plurality of dies to one another and select one or more of the first available erase blocks from one or more dies of the plurality of dies based on the estimated ages to form a first zone. At least one first available erase block from at least one die of the plurality of die is excluded from the first zone.

In one embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to compare an estimated age of a first available erase block in each of the plurality of dies to one another, and select one or more of the first available erase blocks from one or more dies of the plurality of dies based on the estimated ages to form a first zone. At least one first available erase block from at least one die of the plurality of die is excluded from the first zone.

In another embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to switch a first zone from an empty state to an active state, compare an estimated age of a first available erase block in a free pool of each of the plurality of dies to one another, and remove one or more first erase blocks of the compared first available erase blocks from the free pool of one or more dies of the plurality of dies based on the estimated ages to form the first zone. At least one first available erase block from at least one die of the plurality of dies is excluded from the first zone to remain in the free pool of the at least one die. The storage device is further configured to switch a second zone from the empty state to the active state, compare the estimated age of the first available erase block in each of the plurality of dies to one another, and remove one or more second erase blocks of the compared first available erase blocks from one or more dies of the plurality of dies based on the estimated ages to form the second zone. At least one first available erase block from at least one die of the plurality of dies is excluded from the second zone to remain in the free pool of the at least one die.

In another embodiment, a method of forming one or more zones for a storage device comprises switching a first zone from an empty state to an active state. The storage device comprises a plurality of dies, and each of the plurality of dies comprises a plurality of erase blocks. The method further comprises comparing an estimated age of a first available erase block in each of the plurality of dies to one another, and selecting one or more of the first available erase blocks from one or more dies of the plurality of dies based on the estimated ages to form the first zone. At least one first available erase block from at least one die of the plurality of die is excluded from the first zone.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 7A-7C illustrate exemplary embodiments of zones comprised of a plurality of erase blocks selected from a plurality of dies.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller and a media unit. The capacity of the media unit is divided into a plurality of zones. The media unit comprises a plurality of dies, and each of the plurality of dies comprising a plurality of erase blocks. The controller is configured to compare an estimated age of a first available erase block in each of the plurality of dies to one another and select one or more of the first available erase blocks from one or more dies of the plurality of dies based on the estimated ages to form a first zone. At least one first available erase block from at least one die of the plurality of die is excluded from the first zone.

Figure 1:
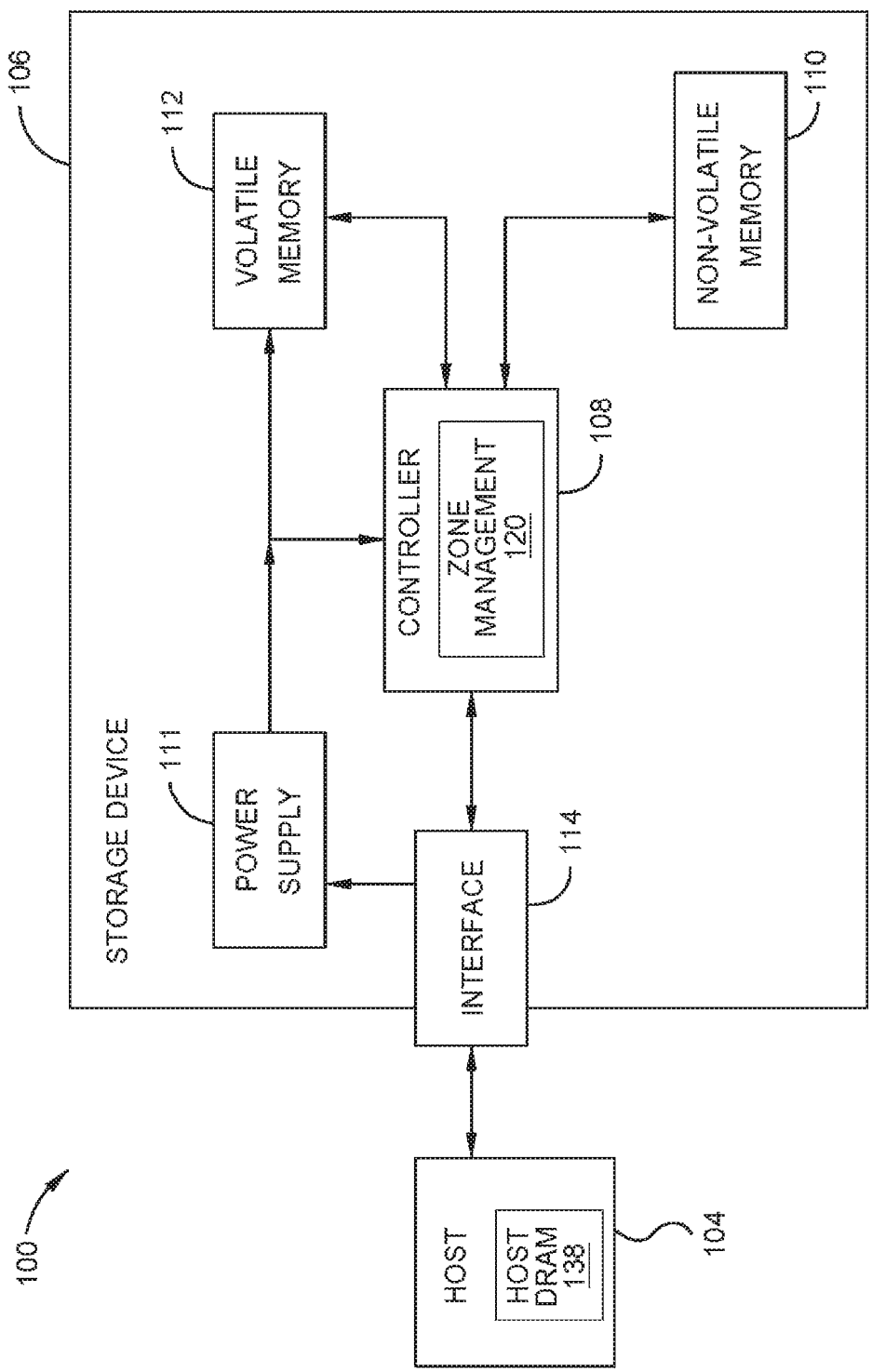
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize non-volatile memory devices 110 included in storage device 106 to store and retrieve data. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, non-volatile memory 110 (NVM 110), a power supply 111, volatile memory 112, and an interface 114. The controller 108 comprises an internal memory 120 or buffer. In some examples, the storage device 106 may include additional components not shown in FIG. 1 for sake of clarity. For example, the storage device 106 may include a printed board (PB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices or media units. NVM 110 may be configured to store and/or retrieve data. For instance, a media unit of NVM 110 may receive data and a message from the controller 108 that instructs the media unit to store the data. Similarly, the media unit of NVM 110 may receive a message from the controller 108 that instructs the media unit to retrieve data. In some examples, each of the media units may be referred to as a die. In some examples, a single physical chip may include a plurality of dies (i.e., a plurality of media units). In some examples, each media unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each media unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or media units. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The storage device 106 includes a controller 108, which may manage one or more operations of the storage device 106. For instance, the controller 108 may manage the reading of data from and/or the writing of data to the NVM 110. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the storage device 106 receives a write command from the host device 104, the controller 108 temporarily stores the data associated with the write command in the internal memory 120 before sending the data to the NVM 110.

Figure 2:
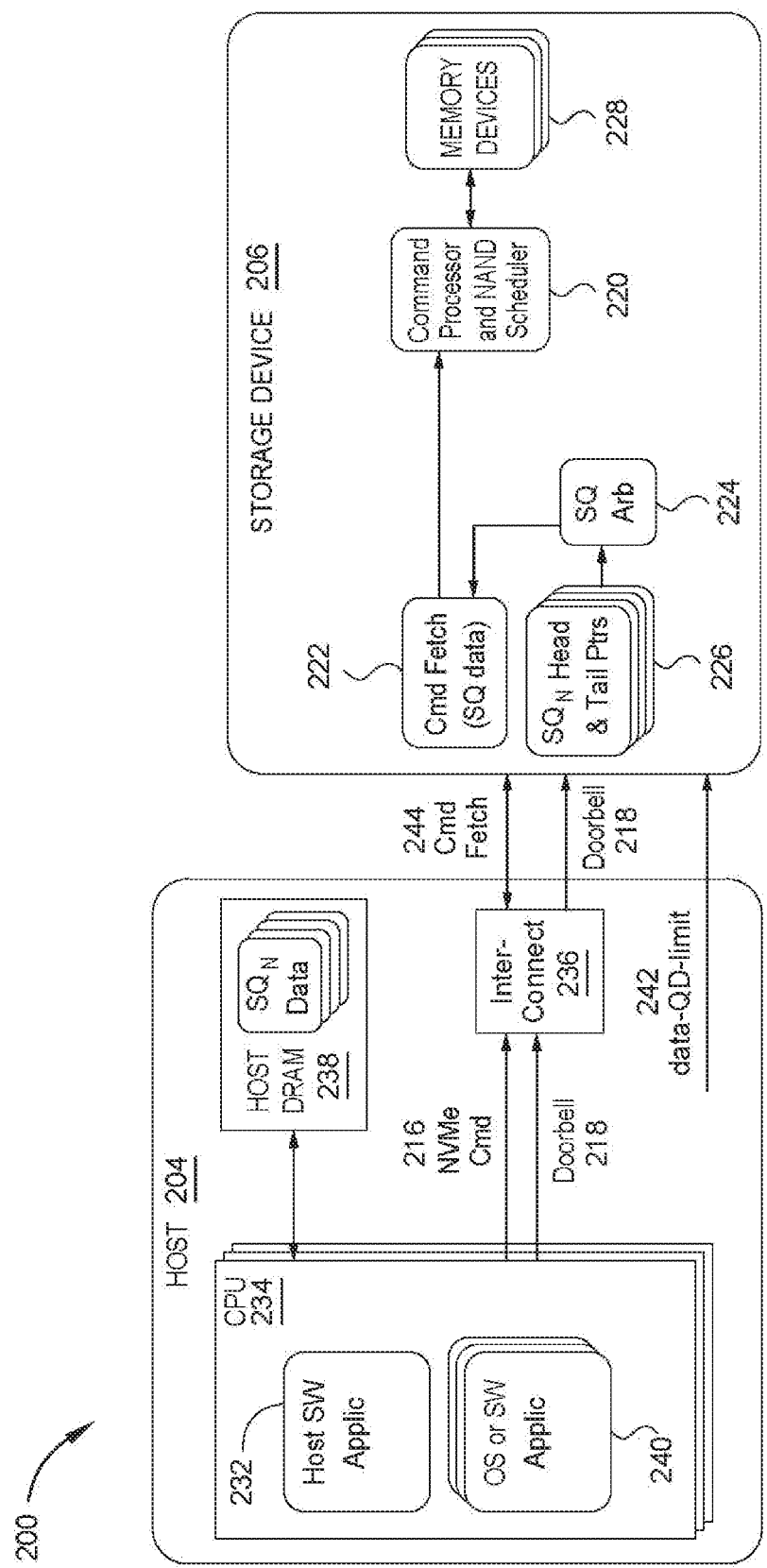
FIG. 2 illustrates a storage system comprising a storage device coupled to a host device, according to another embodiment.

FIG. 2 illustrates a storage system 200 comprising a storage device 206 coupled to a host device 204, according to another embodiment. Storage system 200 may be the storage system 100, the host device 104, and the storage device 106 of FIG. 1.

The storage device 206 may send and receive commands and data from the host device 204, and comprises a command processor 220. The command processor 220 may be the controller 108 of FIG. 1. The command processor 220 may schedule memory device access, such as NAND access, and may perform a read to a memory device prior to a previously received command requiring a write to the same memory device. The command processor 220 is coupled to one or more memory devices 228 and a command fetch 222. The one or more memory devices 228 may be NAND non-volatile memory devices. The command fetch 222 is coupled to a submission queue arbitration 224. The submission queue arbitration 224 is coupled to one or more submission queue head and tail pointers 226.

The host device 204 is comprised of one or more host software applications 232 coupled to one or more processing units or CPU applications 234. In one embodiment, the software application 232 has limited solid-state drive queue depth in order to derive a latency QoS for each user of the system 200. The host device 204 further comprises an operating system (OS) or software application 240 without an associated QoS. The CPU 234 is coupled to an interconnect 236 and to a host DRAM 238. The host DRAM 238 may store submission queue data. The interconnect 236 is coupled to the storage device 206. The interconnect 236 may be in communication with both the submission queue head and tail pointers 226 and the command fetch 222.

The CPU 234 generates one or more commands 216 to send to the storage device 206, and may send and receive commands from the storage device 206 via the command fetch signal 244. The CPU 234 may further send an interrupt or doorbell 218 to the storage device 206 to notify the storage device 206 of the one or more commands 216. The CPU 234 may limit data-queue depth submitted to the storage device 206. Queue depth (QD) is the maximum number of commands queued to the storage device 206, and data-QD is the amount of data associated with the commands queued with a QD. In one embodiment, the data-QD 242 of the storage device 206 is equal to the bandwidth of the storage device 206. Data-QD 242 is limited to the highest level under which the storage device 206 can still maintain a desired latency QoS. The command processor 220 then processes the commands received from the host device 204.

Figure 3:
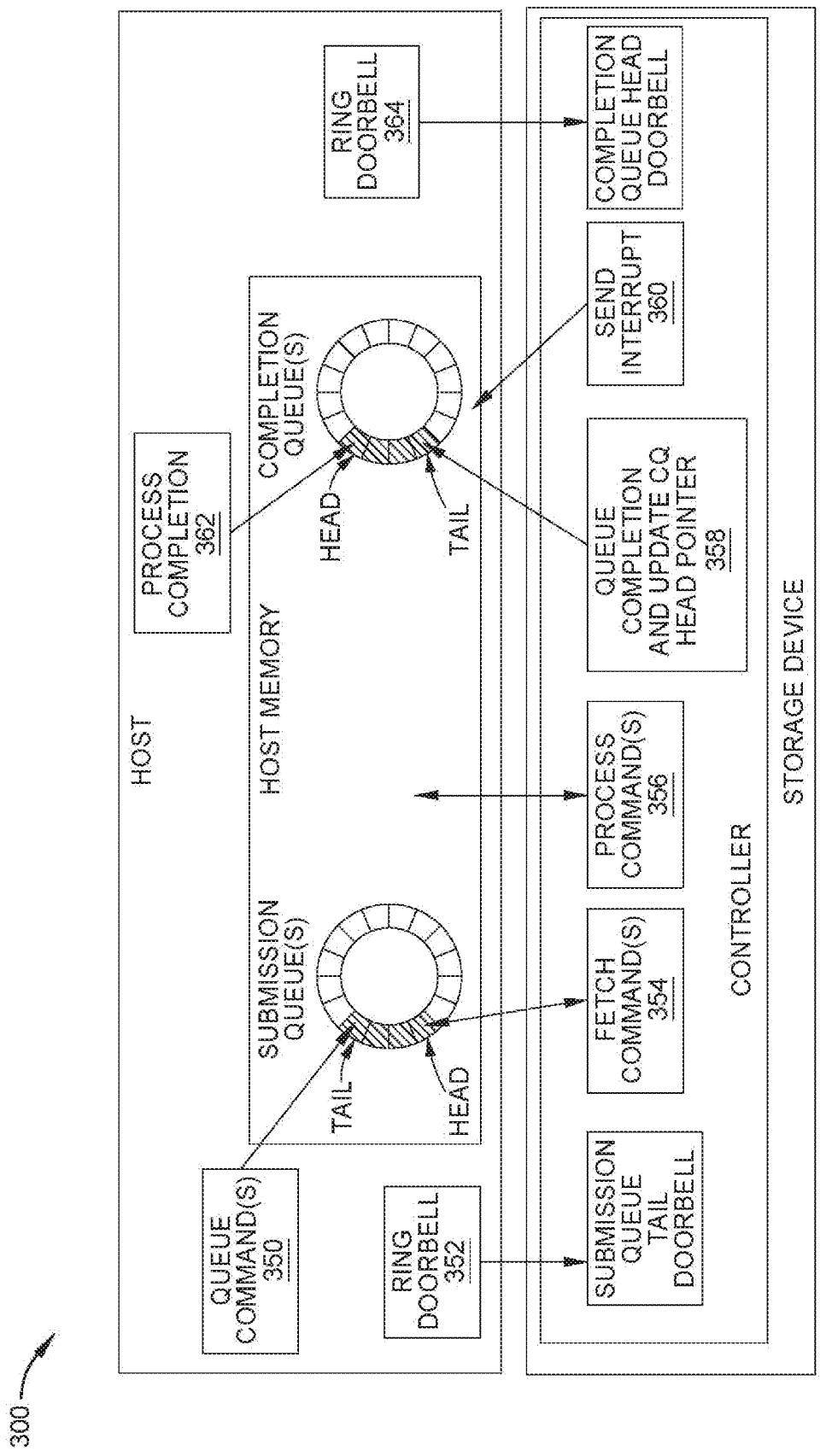
FIG. 3 is a block diagram illustrating a method of operating a storage device to execute a read or write command, according to one embodiment.

FIG. 3 is a block diagram illustrating a method 300 of operating a storage device to execute a read or write command, according to one embodiment. Method 300 may be used with the storage system 100 having a host device 104 and a storage device 106 comprising a controller 108. Method 300 may further be used with the storage system 200 having a host device 204 and a storage device 206 comprising a command processor 220.

Method 300 begins at operation 350, where the host device writes a command into a submission queue as an entry. The host device may write one or more commands into the submission queue at operation 350. The commands may be read commands or write commands. The host device may comprise one or more submission queues.

In operation 352, the host device writes one or more updated submission queue tail pointers and rings a doorbell or sends an interrupt signal to notify or signal the storage device of the new command that is ready to be executed. The doorbell signal may be the doorbell 218 of FIG. 2. The host may write an updated submission queue tail pointer and send a doorbell or interrupt signal for each of the submission queues if there are more than one submission queues. In operation 354, in response to receiving the doorbell or interrupt signal, a controller of the storage device fetches the command from the one or more submission queue, and the controller receives the command.

In operation 356, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more LBA of the zone, and advancing a write pointer of the zone to identify the next available LBA within the zone.

In operation 358, once the command has been fully processed, the controller writes a completion entry corresponding to the executed command to a completion queue of the host device and moves or updates the CQ head pointer to point to the newly written completion entry.

In operation 360, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 362, the host device processes the completion entry. In operation 364, the host device writes an updated CQ head pointer to the storage device and rings the doorbell or sends an interrupt signal to the storage device to release the completion entry.

Figure 4A:
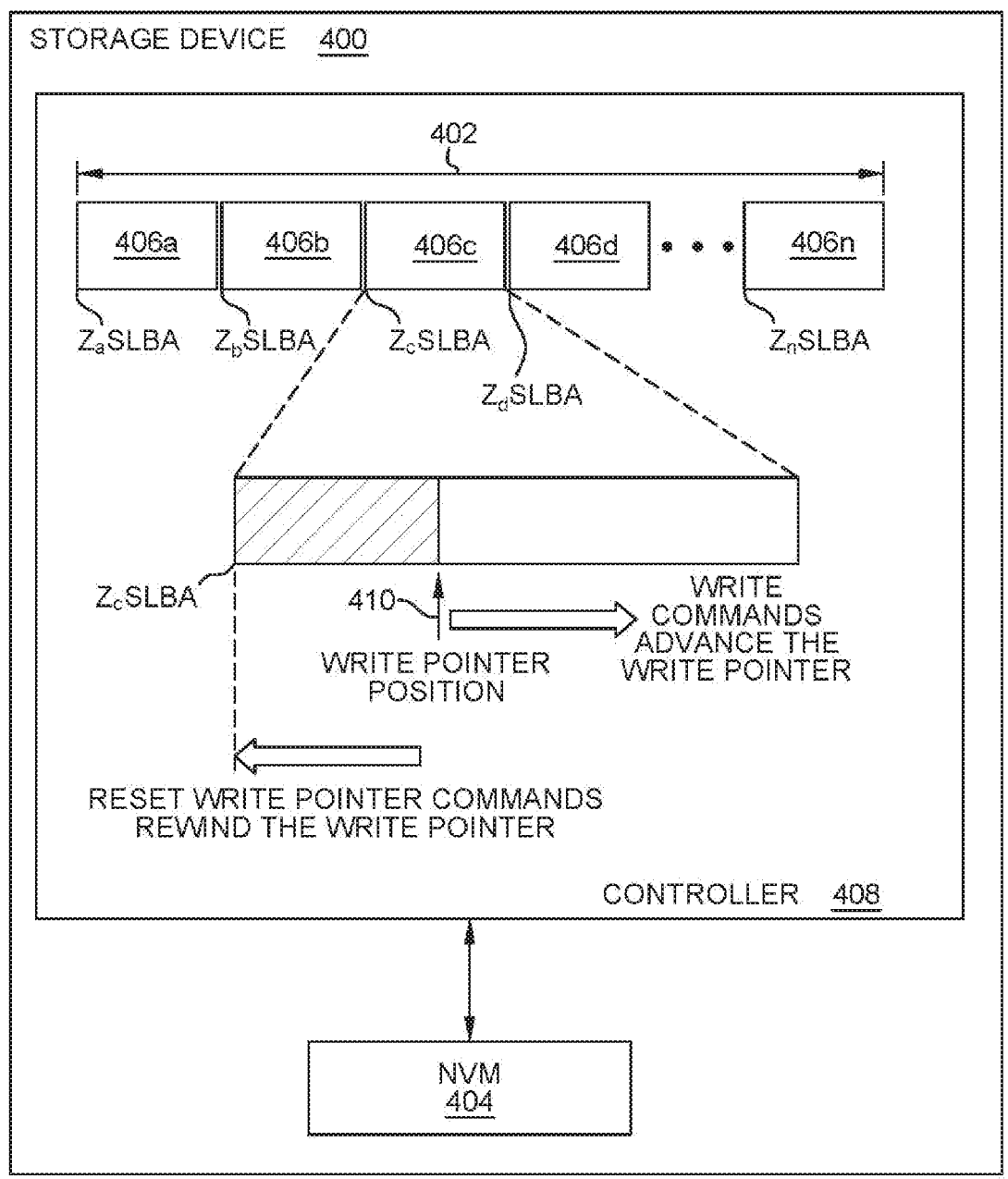
FIG. 4A illustrates a Zoned Namespaces view utilized in a storage device, according to one embodiment.
Figure 4B:
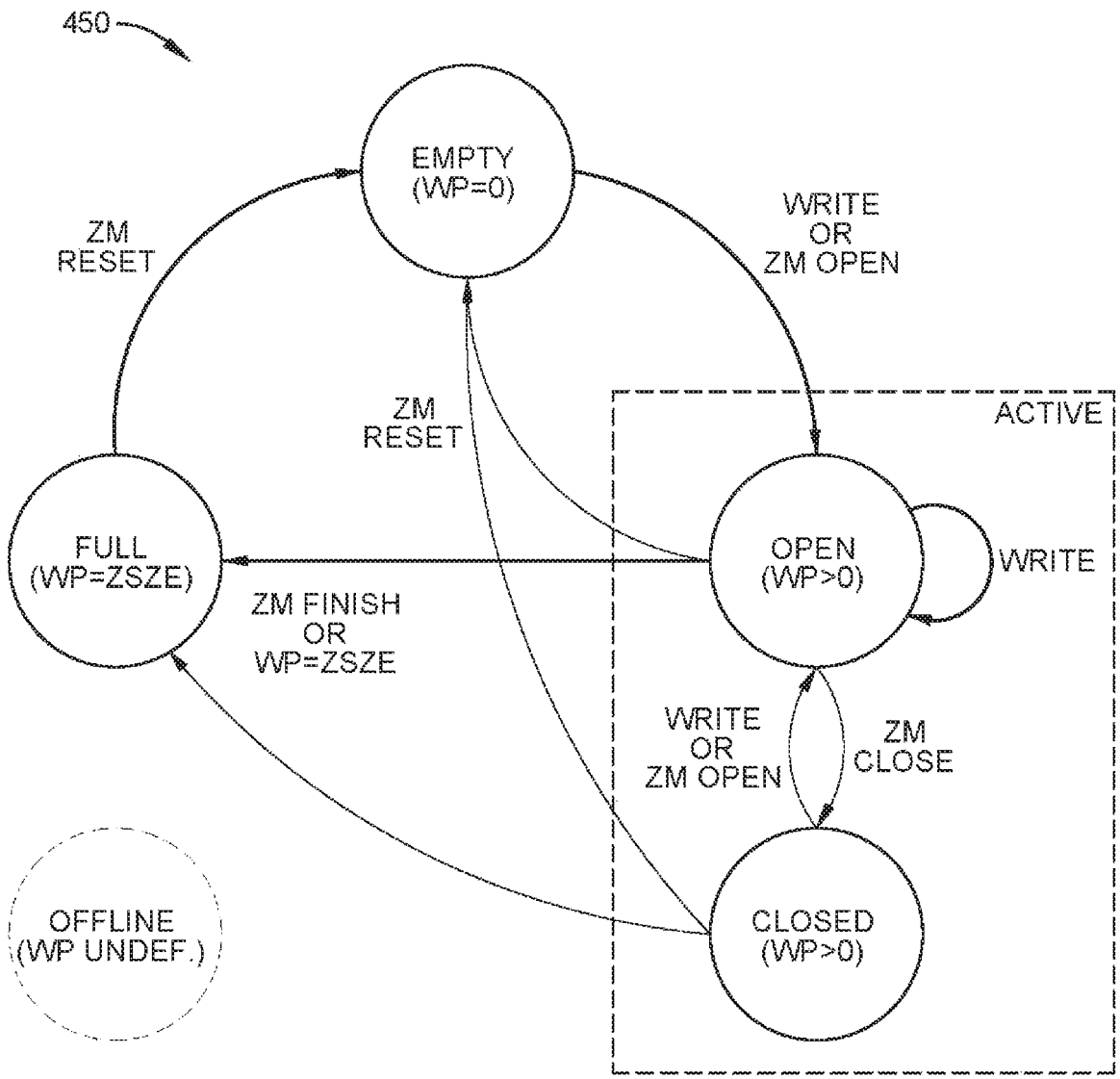
FIG. 4B illustrates a state diagram for the Zoned Namespaces of the storage device of FIG. 4A, according to one embodiment.

FIG. 4A illustrates a Zoned Namespaces (ZNS) 402 view utilized in a storage device 400, according to one embodiment. The storage device 400 may present the ZNS 402 view to a host device. FIG. 4B illustrates a state diagram 450 for the ZNS 402 of the storage device 400, according to one embodiment. The storage device 400 may be the storage device 106 of the storage system 100 of FIG. 1 or the storage device 206 of the storage system 200 of FIG. 2. The storage device 400 may have one or more ZNS 402, and each ZNS 402 may be different sizes. The storage device 400 may further comprise one or more conventional namespaces in addition to the one or more Zoned Namespaces 402. Moreover, the ZNS 402 may be a zoned block command (ZBC) for SAS and/or a zoned-device ATA command set (ZAC) for SATA.

In the storage device 400, the ZNS 402 is the quantity of NVM that can be formatted into logical blocks such that the capacity is divided into a plurality of zones 406a-406n (collectively referred to as zones 406). Each of the zones 406 comprise a plurality of physical or erase blocks (now shown) of a media unit or NVM 404, and each of the erase blocks are associated a plurality of logical blocks (not shown). When the controller 408 receives a command, such as from a host device (not shown) or the submission queue of a host device, the controller 408 can read data from and write data to the plurality of logical blocks associated with the plurality of erase blocks of the ZNS 402. Each of the logical blocks is associated with a unique LBA or sector.

In one embodiment, the NVM 404 is a NAND device. The NAND device comprises one or more dies. Each of the one or more dies comprises one or more planes. Each of the one or more planes comprises one or more erase blocks. Each of the one or more erase blocks comprises one or more word-lines (e.g., 256 wordlines). Each of the one or more word-lines may be addressed in one or more pages. For example, an MLC NAND die may use upper page and lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to throughout, NAND locations are equal to a granularity of 512 bytes. As such, an LBA size of 512 bytes and a page size of 16 kB for two pages of an MCL NAND results in about 16 NAND locations per wordline. However, the NAND location size is not intended to be limiting, and is merely used as a non-limiting example.

When data is written to an erase block, one or more logical blocks are correspondingly updated within a zone 406 to track where the data is located within the NVM 404. Data may be written to one zone 406 at a time until a zone 406 is full, or to multiple zones 406 such that multiple zones 406 may be partially full. Similarly, when writing data to a particular zone 406, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a more parallel fashion (i.e., writing the first NAND location or page of each erase block before writing to the second NAND location or page of each erase block).

Each of the zones 406 is associated with a zone starting logical block address (ZSLBA). The ZSLBA is the first available LBA in the zone 406. For example, the first zone 406a is associated with $Z_a$SLBA, the second zone 406b is associated with $Z_b$SLBA, the third zone 406c is associated with $Z_c$SLBA, the fourth zone 406d is associated with $Z_d$SLBA, and the $n^{th}$ zone 406n (i.e., the last zone) is associated with $Z_n$SLBA. Each zone 406 is identified by its ZSLBA, and is configured to receive sequential writes (i.e., writing data to the NVM 110 in the order the write commands are received).

As data is written to a zone 406, a write pointer 410 is advanced or updated to point to or to indicate the next available block in the zone 406 to write data to in order to track the next write starting point (i.e., the completion point of the prior write equals the starting point of a subsequent write). Thus, the write pointer 410 indicates where the subsequent write to the zone 406 will begin. Subsequent write commands are 'zone append' commands, where the data associated with the subsequent write command appends to the zone 406 at the location the write pointer 410 is indicating as the next starting point. An ordered list of LBAs within the zone 406 may be stored for write ordering. Each zone 406 may have its own write pointer 410. Thus, when a write command is received, a zone 406 is identified by its ZSLBA, and the write pointer 410 determines where the write of the data begins within the identified zone 406.

FIG. 4B illustrates a state diagram 450 for the ZNS 402 of FIG. 4A. In the state diagram 450, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if a zone open command is issued by the host. Zone management (ZM) commands can be used to move a zone between zone open and zone closed states, which are both active states. If a zone is active, the zone comprises open blocks that may be written to, and the host may be provided a description of recommended time in the active state by the ZM or the controller. The controller may comprise the ZM.

The term "written to" includes programming user data on 0 or more word lines in an erase block, erasure, and/or partially filled word lines in an erase block when user data has not filled all of the available word lines. The term "written to" may further include closing a zone due to internal drive handling needs (open block data retention concerns because the bits in error accumulate more quickly on open erase blocks), the storage device 400 closing a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. New data pulled-in from the host device or valid data being relocated may be written to an open zone. Valid data may be moved from one zone (e.g. the first zone 402a) to another zone (e.g. the third zone 402c) for garbage collection purposes. A closed zone is an empty or partially full zone that is not currently receiving writes from the host in an ongoing basis. The movement of a zone from an open state to a closed state allows the controller 408 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available blocks to write data to (i.e., WP=zone capacity (ZCAP)). Read commands of data stored in full zones may still be executed.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an active zone. A zone may be erased any time between a ZM reset and a ZM open. An offline zone is a zone that is unavailable to write data to. An offline zone may be in the full state, the empty state, or in a partially full state without being active.

Since resetting a zone clears or schedules an erasure of the data stored in the zone, the need for garbage collection of individual erase blocks is eliminated, improving the overall garbage collection process of the storage device 400. The storage device 400 may mark one or more erase blocks for erasure. When a new zone is going to be formed and the storage device 400 anticipates a ZM open, the one or more erase blocks marked for erasure may then be erased. The storage device 400 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 410 for the zone 406 may be selected, enabling the zone 406 to be tolerant to receive commands out of sequential order. The write pointer 410 may optionally be turned off such that a command may be written to whatever starting LBA is indicated for the command.

Referring back to FIG. 4A, when the controller 408 initiates or pulls-in a write command, the controller 408 may select an empty zone 406 to write the data associated with the command to, and the empty zone 406 switches to an active zone 406. As used herein, the controller 408 initiating, receiving, or pulling-in a write command comprises receiving a write command or direct memory access (DMA) reading the write command. The write command may be a command to write new data, or a command to move valid data to another zone for garbage collection purposes. The controller 408 is configured to DMA read or pull-in new commands from a submission queue populated by a host device.

In an empty zone 406 just switched to an active zone 406, the data is written to the zone 406 starting at the ZSLBA, as the write pointer 410 is indicating the logical block associated with the ZSLBA as the first available logical block. The data may be written to one or more erase blocks or NAND locations that have been allocated for the physical location of the zone 406. After the data associated with the write command has been written to the zone 406, the write pointer 410 is updated to point to the next available block in the zone 406 to track the next write starting point (i.e., the completion point of the first write). Alternatively, the controller 408 may select an active zone to write the data to. In an active zone, the data is written to the logical block indicated by the write pointer 410 as the next available block.

For example, the controller 408 may receive or pull-in a first write command to a third zone 406c, or a first zone append command. The host identifies sequentially which logical block of the zone 406 to write the data associated with the first command to. The data associated with the first command is then written to the first or next available LBA(s) in the third zone 406c as indicated by the write pointer 410, and the write pointer 410 is advanced or updated to point to the next available LBA available for a host write (i.e., WP>0). If the controller 408 receives or pulls-in a second write command to the third zone 406c, the data associated with the second write command is written to the next available LBA(s) in the third zone 406c identified by the write pointer 410. Once the data associated with the second command is written to the third zone 406c, the write pointer 410 once again advances or updates to point to the next available LBA available for a host write. Resetting the zone 406c moves the write pointer 410 back to the $Z_c$SLBA (i.e., WP=0), and the zone 406c switches to an empty zone.

Figure 5:
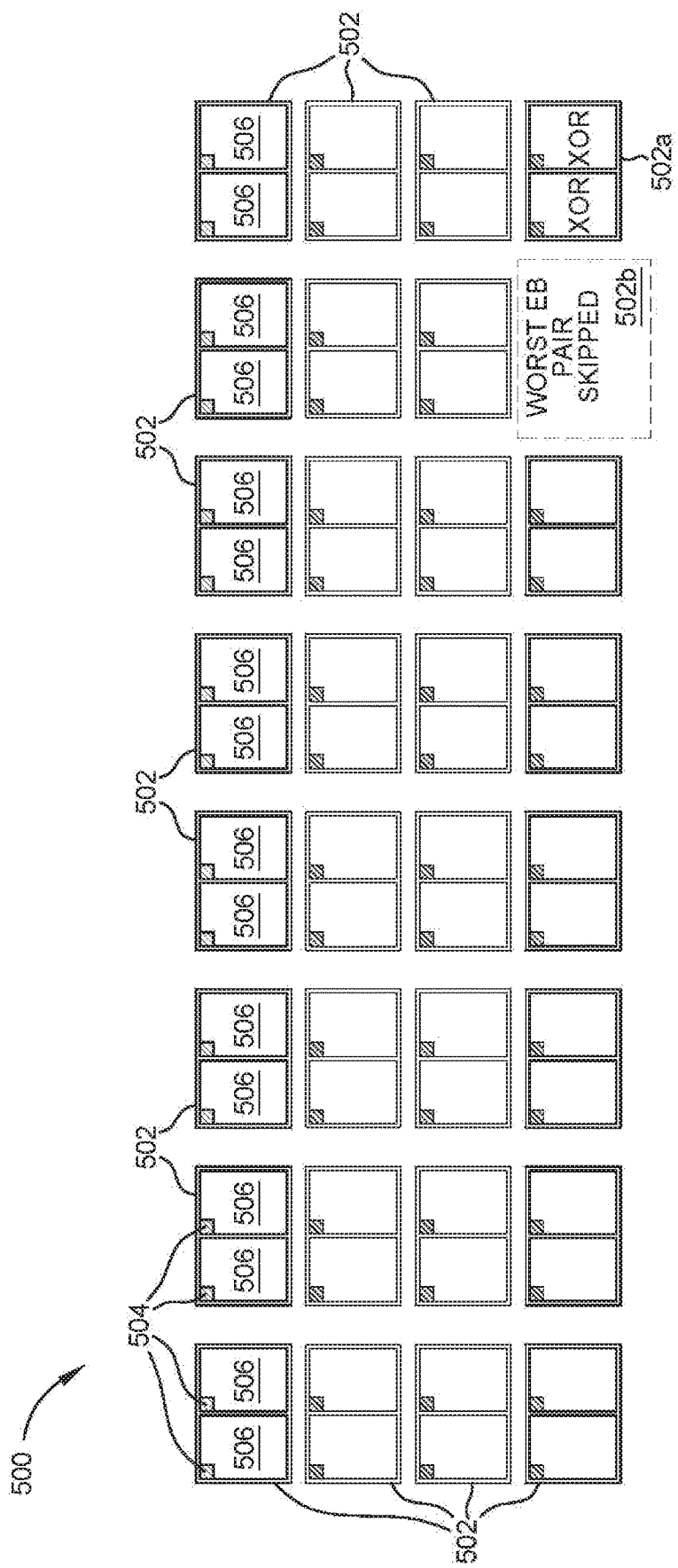
FIG. 5 illustrates a zone comprised of a plurality of erase blocks selected from a plurality of dies, according to one embodiment.

FIG. 5 illustrates a zone 500 comprised of a plurality of erase blocks 504 selected from a plurality of dies 502, according to one embodiment. The zone 500 may be a zone 406 of the ZNS 402 of FIG. 4A. The zone 500 may be a zone of the NVM 110 of FIG. 1 coupled to the controller 108.

A storage device, such as the storage device 106 of FIG. 1 or the storage device 206 of FIG. 2, is coupled to a memory device, such as the NVM 110 of FIG. 1, which comprises a plurality of dies 502. While 32 dies 502 are shown, any number of dies may be included. Each die 502 is comprised of a pair of planes 506, and each plane 506 is comprised of a plurality of erase blocks 504.

A zone 500 is formed by selecting an erase block 504 from each plane 506 of 30 out of the 32 dies 502, and assigning or associating the logical block address corresponding to the erase blocks 504 to the zone 500. Out of the 32 total dies 502, 30 dies 502 can be utilized to store data, one XOR die 502a can be utilized to store XOR data, and one excluded or skipped die 502b comprised of the least desirable erase blocks 504 that is not utilized in the zone 500. The XOR die 502a is optional, and provides die failure protection and maximizes leverage when utilized. The excluded erase blocks 504 of the skipped die 502b remain in the available free pool of blocks such that they may be selected to form another zone, eliminating optimization problems.

The zone 500 may have any capacity (ZCAP), such as 256 MiB or 512 MiB. However, a small portion of the zone 500 may be inaccessible to write data to, but may still be read, such as a portion of the zone 500 storing the XOR data and one or more excluded erase blocks 504 of the skipped die 502b. For example, if the total capacity of a zone 500 is 512 MiB, the ZCAP may be 470 MiB, which is the capacity available to write data to, while 42 MiB are unavailable to write data.

Figures 6A, 6B:
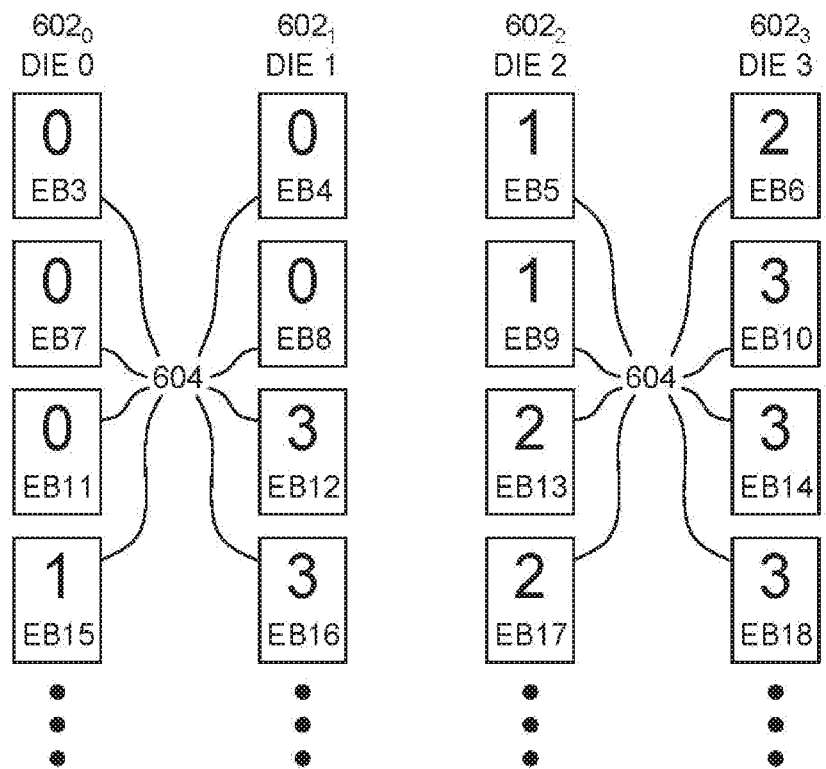
FIG. 6A illustrates a plurality of single plane dies each comprising a plurality of erase blocks utilized to form a plurality of zones, according to one embodiment.
FIG. 6B illustrates a table displaying which erase blocks from which dies are used to form each zone of FIG. 6A.

FIG. 6A illustrates a plurality of single plane dies 602 each comprising a plurality of erase blocks 604 utilized to form a plurality of zones 600, according to one embodiment. FIG. 6B illustrates a table 650 displaying which erase blocks 604 from which dies 602 are used to form each zone 600. Each zone 600 may be a zone 406 of the ZNS 402 of FIG. 4A or the zone 500 of FIG. 5. Each zone 600 may be a zone of the NVM 110 of FIG. 1 coupled to the controller 108, and the NVM 110 may comprise the plurality of dies 602. Additionally, the zone 600 may have any capacity, such as 256 MiB or 512 MiB. However, a small portion of the zone 600 may be inaccessible to write data to, but may still be read, such as the portion of the zone 600 storing the XOR data and excluded erase blocks of one or more skipped dies, like the skipped die 502b of FIG. 5. For example, if the total capacity of a zone 600 is 512 MiB, 470 MiB, the ZCAP may be 470 MiB, which is the capacity available to write data to, write data to while 42 MiB are unavailable to write data.

In the embodiment of FIGS. 6A-6B, each zone $600_0$-$600_3$ (collectively referred to as zones 600) comprises three erase blocks 604 selected from three different dies 602 out of the four total dies 602, as well as an optional XOR die (not shown). While only four dies 602 are shown, any number of dies 602 may be utilized. Additionally, while each die 602 is shown comprising only four erase blocks 604, the dies 602 may comprise any number of erase blocks 604. Moreover, dual plane dies 602, such as the dies 502 of FIG. 5, may be utilized rather than the single plane dies 602.

In FIG. 6A, each die $602_0$-$602_3$ (collectively referred to as dies 602) comprises a plurality of erase blocks (EB) 604. For example, the first die $602_0$ comprises EB3, EB7, EB11, and EB15, the second die $602_1$ comprises EB4, EB8, EB12, and EB16, the third die $602_2$ comprises EB5, EB9, EB13, and EB17, and the fourth die $602_3$ comprises EB6, EB10, EB14, and EB18. Each of the erase blocks 604 are in the free pool (not shown) of erase blocks 604 until selected for zone formation. The free pool of erase blocks 604 is a pool of all unselected or available erase blocks 604 that are not currently being utilized in a zone 600.

Each erase block 604 is shown with a number estimating the age of the particular erase block 604. For example, EB3 has an estimated age of 0 while EB6 has an estimated age of 2. When selecting erase blocks 604 to form a zone 600, the erase blocks 604 with the lowest estimated age (i.e., the youngest erase blocks) are selected first. The youngest erase blocks 604 may be the erase blocks 604 that have the fewest number of program-erase cycles so far, have the greatest estimated endurance, and/or have the greatest estimated retention. Other factors that may indicate a young erase block 604 include the current bit error rate (BER) of the data, read speed, program speed, data retention quantification, read/program disturb, most recently used, and least recently used. One or more age factors of the erase block 604 may be combined or aggregated to determine the estimated age. Similarly, when selecting erase blocks 604 to form a zone 600, the age of the die 602 may be estimated, and erase blocks 604 may be selected from the youngest dies 602. Each time an erase block 604 is selected for a zone 600, the erase block 604 is removed from the free pool.

The table 650 illustrates a plurality of zones $600_0$-$600_3$. Each of the zones 600 may be empty zones that are being formed in order to switch to active zones. To form each zone 600, a controller or a ZM is configured to compare the estimated age of the first available erase block 604 within each die 602 in order to select the youngest erase blocks 604. The controller or ZM selects the three youngest erase blocks 604 for a zone 600 while excluding the oldest erase block, allowing the wear level of each of the erase blocks 604 to be mitigated and uniformly spread amongst the blocks.

To form the first zone $600_0$, the estimated age of each of the first available erase blocks 604 in each of the dies 602 are compared to one another, and the erase block 604 having the greatest estimated age is skipped. As such, the first zone $600_0$ is comprised of EB3 having an estimated age of 0 from the first die $602_0$, EB4 having an estimated age of 0 from the second die $602_1$, and EB5 having an estimated age of 1 from the third die $602_2$. Since the first available erase block 604 of the fourth die $602_3$, EB6, has an estimated age of 2, which is greater than the estimated age of the first available erase blocks 604 in first, second, and third dies $602_0$-$602_2$ (e.g., EB3, EB4, EB5), EB6 is excluded or skipped, and no erase block 604 is selected from the fourth die $602_3$ for the first zone $600_0$. Thus, the fourth die $602_3$ is excluded from contributing an erase block to the first zone $600_0$. EB6 remains in the free pool of erase blocks for the fourth die $602_3$, and may be selected to form another zone 600 to eliminate optimization problems. Leaving EB6 in the free pool allows EB6 to recover, and further allows the wear level of each of the erase blocks 604 in each die 602 to be mitigated or to be spread as evenly as possible.

Since EB3, EB4, and EB5 were selected to form the first zone $600_0$, EB3, EB4, and EB5 are no longer available in the free pool of blocks for the first, second, and third dies $602_0$-$602_2$. As such, EB7 having an estimated age of 0 is the first available erase block 604 from the first die $602_0$, EB8 having an estimated age of 0 is the first available erase block 604 from the second die $602_1$, EB9 having an estimated age of 1 is the first available erase block 604 from the third die $602_2$, and EB6 having an estimated age of 2 is the first available erase block 604 from the fourth die $602_3$. The three youngest first available erase blocks 604 are again selected to form a second zone $600_1$ while the oldest erase block 604 is skipped.

Thus, the second zone $600_1$ is comprised of EB7 the first die $602_0$, EB8 from the second die $602_1$, and EB9 from the third die $602_2$. Since the first available erase block 604 of the fourth die $602_3$, EB6, has an estimated age of 2, which is greater than the estimated age of the first available erase blocks 604 in first, second, and third dies $602_0$-$602_2$ (e.g., EB7, EB8, EB9), EB6 is excluded or skipped once more, and no erase block 604 is selected from the fourth die $602_3$ for the second zone $600_1$. Thus, the fourth die $602_3$ is excluded from contributing an erase block to the second zone $600_1$. Again, EB6 remains in the free pool of erase blocks for the fourth die $602_3$, and may be selected to form another zone 600 to eliminate optimization problems.

Similarly, a third zone $600_2$ is comprised of EB11 having an estimated age of 0 from the first die $602_0$, EB13 having an estimated age of 2 from the third die $602_2$, and EB6 having an estimated age of 2 from the fourth die $602_3$. Since the first available erase block 604 of the second die $602_1$, EB12, has an estimated age of 3, which is greater than the estimated age of the first available erase blocks 604 in first, third, and fourth dies $602_0$, $602_2$, $602_3$ (e.g., EB11, EB13, EB6), EB12 is excluded or skipped, and no erase block 604 is selected from the second die $602_1$ for the third zone $600_2$. Thus, the second die $602_1$ is excluded from contributing an erase block to the third zone $600_2$. EB12 remains in the free pool of erase blocks for the second die $602_1$, and may be selected to form another zone 600 to eliminate optimization problems.

Following the formation of the third zone $600_2$, EB15 having an estimated age of 1 is the first available erase block 604 from the first die $602_0$, EB12 having an estimated age of 3 is the first available erase block 604 from the second die $602_1$, EB17 having an estimated age of 2 is the first available erase block 604 from the third die $602_2$, and EB10 having an estimated age of 3 is the first available erase block 604 from the fourth die $602_3$. To form the fourth zone $600_3$, EB15 is selected from the first die $602_0$, EB17 is selected from the third die $602_2$, and either EB12 from the second die $602_1$ or EB10 from the fourth die $602_3$ is selected. Since the first available erase block 604 of the second die $602_1$, EB12, and the first available erase block of the fourth die $602_3$, EB10, have the same estimated age of 3, either EB12 or EB10 may be selected to form the fourth zone $600_3$.

However, in embodiments where the first available erase block 604 of one or more dies 602 have the same estimated age (e.g., EB12 and EB10), the erase block 604 from the die 602 having the larger available free pool of erase blocks 604 is selected. Thus, in the example of the fourth zone $600_3$, the second die $602_1$ has two erase blocks 604 in the free pool (e.g., EB12 and EB 16) while the fourth die $602_3$ has three erase blocks 604 in the free pool (e.g., EB10, EB14, and EB 18). Thus, the second die $602_1$ is excluded from contributing an erase block to the fourth zone $600_3$. Again, EB12 remains in the free pool of erase blocks for the second die $602_1$, and may be selected to form another zone 600 to eliminate optimization problems.

Additionally, when the first available erase block 604 of one or more dies 602 have the same estimated age, other factors may be considered to prevent the first encountered die 602 (e.g., the second die $602_1$) from always being selected. For example, the erase block 604 having the greatest estimated retention may be selected, a limit may be set for the delta of the most picked die 602 to the least picked die 602, or the starting point of the zone formation may be changed (i.e., start with a different die 602 than the first die $602_0$).

Each time a zone 600 is erased of data, switched to the erase state, and then switched to the active state, the zone 600 may be reformed with new erase blocks 604 according to the method described above. When a zone 600 is erased and switched to the erase state, the erase blocks 604 of the zone 600 are returned to the free pool of erase blocks 604 in each die 602. When returned to the free pool, the age of each of the erase blocks 604 may be re-estimated.

FIGS. 7A-7C illustrates zones 700, 750, 770, respectively, comprised of a plurality of erase blocks 704 selected from a plurality of dies 702, according to embodiments disclosed herein. Each of the zones 700, 750, 770 may individually be a zone 406 of the ZNS 402 of FIG. 4A or the zone 600 of FIGS. 6A-6B. Each zones 700, 750, 770 may be a zone of the NVM 110 of FIG. 1 coupled to the controller 108, and the NVM 110 may comprise the plurality of dies 702. Additionally, each of the zones 700, 750, 770 may be formed as described in FIGS. 6A-6B, where a controller or a zone management (ZM) is configured to compare the estimated age of the first available erase blocks 604 within each die 702 in order to select the youngest erase blocks 704.

While each of the dies 702 are shown with two planes 706, the dies 702 may include one or more planes 706. A controller is configured to compare an estimated age of a first available erase block 704 in each plane 706 of each of the plurality of dies 702 to one another, select one or more planes 706 from one or more of the dies 702, and select one or more erase blocks 704 from the one or more planes 706 based on the estimated ages to form a zone 700, 750, 770. At least one erase block 704 from at least one plane 706 of a die (i.e., skipped die 702b) is excluded from contributing one or more erase blocks 704 to a zone.

Moreover, each of the zones 700, 750, 770 may have any capacity, such as 256 MiB or 512 MiB. However, a small portion of each zone 700, 750, 770 may be inaccessible to write data to, but may still be read, such as the portion of the zones 700, 750, 770 storing the XOR data and the excluded erase blocks 704 from the skipped dies 702b. For example, if the total capacity of a zone 700, 750, 770 is 512 MiB, 470 MiB may be available to write data to while 42 MiB are unavailable to write data.

FIG. 7A illustrates an exemplary zone 700 formed from a memory device comprising 16 dies 702. Out of the 16 dies 702, 14 dies 702 are utilized for storing data, one XOR die 702a is utilized for XOR data, and one skipped die 702b comprising the oldest or worst erase blocks is not included in the zone 700. The excluded erase block(s) 704 of the skipped die 702b remain in the free pool, and may be selected to form another zone to eliminate optimization problems.

FIG. 7B illustrates another exemplary zone 750 formed from a memory device comprising 8 dies 702. Out of the 8 dies 702, 6 dies 702 are utilized for storing data, one XOR die 702a is utilized for XOR data, and one skipped die 702b comprising the oldest or worst erase blocks is not included in the zone 750. The excluded erase block(s) 704 of the skipped die 702b remain in the free pool, and may be selected to form another zone to eliminate optimization problems.

FIG. 7C illustrates yet another exemplary zone 770 formed from a memory device comprising 16 dies 702. Out of the 16 dies 702, 11 dies 702 are utilized for storing data, one XOR die 702a is utilized for XOR data, and four skipped dies 702b comprising the oldest or worst erase blocks are not included in the zone 770. While FIGS. 6A-6B described skipping only one erase block 704 from one die 702, multiple erase blocks 704 from multiple dies 702 may be skipped. The excluded erase block(s) 704 of the skipped die 702b remain in the free pool, and may be selected to form another zone to eliminate optimization problems.

By excluding an erase block having the greatest estimated age, greatest number of program-erase cycles, or least estimated amount of retention when forming a zone, the wear level of all of the erase blocks can be spread as evenly as possible while eliminating optimization problems. The excluded or skipped erase block(s) may recover while the younger erase blocks are utilized, minimizing the age gap between each of the erase blocks and preventing one or more erase blocks from undergoing a disproportionate amount of program-erase cycles. As such, the wear level of each of the erase blocks will be mitigated, minimizing the number of erase blocks becoming unusable or damaged.

In one embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to compare an estimated age of a first available erase block in each of the plurality of dies to one another, and select one or more of the first available erase blocks from one or more dies of the plurality of dies based on the estimated ages to form a first zone. At least one first available erase block from at least one die of the plurality of die is excluded from the first zone.

The controller may be further configured to repeat comparing the estimated age of the first available erase block in each of the plurality of dies to one another, and select one or more of the first available erase blocks from one or more dies of the plurality of dies to form a second zone, wherein at least one first available erase block from at least one die of the plurality of die is excluded from the second zone. The at least one first available erase block excluded from the first zone may be the same at least one first available erase block excluded from the second zone. The at least one first available erase block excluded from the first zone may be a different erase block than the at least one first available erase block excluded from the second zone. The at least one first available erase block of the at least one die excluded from the first zone may have a greater estimated age than the one or more erase blocks selected to form the first zone. The first zone may further comprise at least one XOR erase block for storing XOR data. The at least one first available erase block of the at least one die excluded from the first zone may remain in a free pool of the at least one die.

In another embodiment, a storage device comprises a media unit. A capacity of the media unit is divided into a plurality of zones. The media unit comprises a plurality of dies, each of the plurality of dies comprising a plurality of erase blocks. The storage device further comprises a controller coupled to the media unit, the controller configured to switch a first zone from an empty state to an active state, compare an estimated age of a first available erase block in a free pool of each of the plurality of dies to one another, and remove one or more first erase blocks of the compared first available erase blocks from the free pool of one or more dies of the plurality of dies based on the estimated ages to form the first zone. At least one first available erase block from at least one die of the plurality of dies is excluded from the first zone to remain in the free pool of the at least one die. The storage device is further configured to switch a second zone from the empty state to the active state, compare the estimated age of the first available erase block in each of the plurality of dies to one another, and remove one or more second erase blocks of the compared first available erase blocks from one or more dies of the plurality of dies based on the estimated ages to form the second zone. At least one first available erase block from at least one die of the plurality of dies is excluded from the second zone to remain in the free pool of the at least one die.

The at least one first available erase block excluded from the first zone may be a different erase block than the at least one first available erase block excluded from the second zone. The at least one first available erase block of the at least one die excluded from the first zone may have a greater estimated age than the one or more first erase blocks removed to form the first zone. The at least one first available erase block of the at least one die excluded from the first zone may have undergone a greater estimated number of program-erase cycles than the one or more first erase blocks removed to form the first zone. The at least one first available erase block of the at least one die excluded from the second zone may have undergone a greater estimated number of program-erase cycles than the one or more second erase blocks removed to form the second zone.

The controller may be further configured to determine one or more of the first available erase blocks have the same estimated age, compare a size of the free pool of each of the dies comprising the one or more first available erase blocks having the same estimated age, and exclude an erase block of the one or more first available erase blocks having the same estimated age based on the size of the free pool. The excluded erase block may be disposed in a die having the smallest sized free pool.

In another embodiment, a method of forming one or more zones for a storage device comprises switching a first zone from an empty state to an active state. The storage device comprises a plurality of dies, and each of the plurality of dies comprises a plurality of erase blocks. The method further comprises comparing an estimated age of a first available erase block in each of the plurality of dies to one another, and selecting one or more of the first available erase blocks from one or more dies of the plurality of dies based on the estimated ages to form the first zone. At least one first available erase block from at least one die of the plurality of die is excluded from the first zone.

The method may further comprise determining one or more of the first available erase blocks have the same estimated age, and excluding an erase block of the one or more first available erase blocks having the same estimated age based on an estimated retention of the erase block or a bit error rate. The one or more of the first available erase blocks selected to form the first zone may be removed from a free pool of the one or more dies. The at least one first available erase block of the at least one die excluded from the first zone may remain in a free pool of erase blocks of the at least one die. The at least one first available erase block of the at least one die excluded from the first zone may have a greater estimated age or a greater amount of estimated program-erase cycles than the one or more first available erase blocks selected to form the first zone. Comparing the estimated age of the first available erase block in each of the plurality of dies to one another may further comprise comparing a size of a free pool or erase blocks of each of the plurality of dies to one another.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
a media unit, wherein a capacity of the media unit is divided into a plurality of zones, wherein the media unit comprises a plurality of dies, each of the plurality of dies comprising a plurality of erase blocks, and wherein each zone of the plurality of zones comprises two or more erase blocks of the plurality of erase blocks, the two or more erase blocks being selected from a free pool of erase blocks of the plurality of dies; and
a controller coupled to the media unit, the controller configured to:
compare an estimated age of a first available erase block in each of the plurality of dies to one another; and
select two or more of the first available erase blocks from two or more dies of the plurality of dies based on the estimated ages to form a first zone, wherein at least one first available erase block from at least one die of the plurality of dies is excluded from the first zone, the at least one first available erase block excluded from the first zone remaining in the free pool of erase blocks, wherein a wear level of the first available erase blocks is uniformly spread after the exclusion of the at least one first available erase block from the first zone.

2. The storage device of claim 1, wherein the controller is further configured to:
repeat comparing the estimated age of the first available erase block in each of the plurality of dies to one another; and
select two or more of the first available erase blocks from two or more dies of the plurality of dies based on the estimated ages to form a second zone, wherein at least one first available erase block from at least one die of the plurality of die is excluded from the second zone, the at least one first available erase block excluded from the second zone remaining in the free pool of erase blocks, wherein the wear level of the first available erase blocks is uniformly spread after the exclusion of the at least one first available erase block from the second zone.

3. The storage device of claim 2, wherein the at least one first available erase block excluded from the first zone is the same erase block as the at least one first available erase block excluded from the second zone.

4. The storage device of claim 2, wherein the at least one first available erase block excluded from the first zone is a different erase block than the at least one first available erase block excluded from the second zone.

5. The storage device of claim 1, wherein the at least one first available erase block of the at least one die excluded from the first zone has a greater estimated age than the two or more first available erase blocks selected to form the first zone.

6. The storage device of claim 1, wherein the first zone further comprises at least one XOR erase block for storing XOR data.

7. A storage device, comprising:
a media unit, wherein a capacity of the media unit is divided into a plurality of zones, wherein the media unit comprises a plurality of dies, each of the plurality of dies comprising a plurality of erase blocks, and wherein each zone of the plurality of zones comprises two or more erase blocks of the plurality of erase blocks, the two or more erase blocks being selected from a free pool of erase blocks of the plurality of dies; and
a controller coupled to the media unit, the controller configured to:
switch a first zone from an empty state to an active state;
compare an estimated age of a first available erase block in a free pool of each of the plurality of dies to one another;
remove two or more first erase blocks of the compared first available erase blocks from the free pool of two or more dies of the plurality of dies based on the estimated ages to form the first zone, wherein at least one first available erase block from at least one die of the plurality of dies is excluded from the first zone to remain in the free pool of the at least one die, the at least one first available erase block excluded from the first zone remaining in the free pool of erase blocks, wherein a wear level of the first available erase blocks is uniformly spread after the exclusion of the at least one first available erase block from the first zone;
switch a second zone from the empty state to the active state;
compare the estimated age of the first available erase block in each of the plurality of dies to one another; and
remove two or more second erase blocks of the compared first available erase blocks from two or more dies of the plurality of dies based on the estimated ages to form the second zone, wherein at least one first available erase block from at least one die of the plurality of dies is excluded from the second zone to remain in the free pool of the at least one die, the at least one first available erase block excluded from the second zone remaining in the free pool of erase blocks, wherein the wear level of the first available erase blocks is uniformly spread after the exclusion of the at least one first available erase block from the second zone.

8. The storage device of claim 7, wherein the at least one first available erase block excluded from the first zone is a different erase block than the at least one first available erase block excluded from the second zone.

9. The storage device of claim 7, wherein the at least one first available erase block of the at least one die excluded from the first zone has a greater estimated age than the two or more first erase blocks removed to form the first zone.

10. The storage device of claim 7, wherein the at least one first available erase block of the at least one die excluded from the first zone has undergone a greater estimated number of program-erase cycles than the two or more first erase blocks removed to form the first zone.

11. The storage device of claim 7, wherein the at least one first available erase block of the at least one die excluded from the second zone has undergone a greater estimated number of program-erase cycles than the two or more second erase blocks removed to form the second zone.

12. The storage device of claim 7, wherein the controller is further configured to:

determine two or more of the first available erase blocks have the same estimated age;

compare a size of the free pool of each of the dies comprising the two or more first available erase blocks having the same estimated age; and exclude an erase block of the two or more first available erase blocks having the same estimated age based on the size of the free pool from the first zone.

13. The storage device of claim 12, wherein the excluded erase block is disposed in a die having the smallest sized free pool.

14. A method of forming one or more zones for a storage device, comprising:

switching a first zone from an empty state to an active state, wherein:
- a capacity of the storage device is divided into a plurality of zones,
- the storage device comprises a plurality of dies, each of the plurality of dies comprises a plurality of erase blocks, and
- each zone of the plurality of zones comprises two or more erase blocks of the plurality of erase blocks, the two or more erase blocks being selected from a free pool of erase blocks of the plurality of dies;

comparing an estimated age of a first available erase block in each of the plurality of dies to one another; and selecting two or more of the first available erase blocks from two or more dies of the plurality of dies based on the estimated ages to form the first zone, wherein at least one first available erase block from at least one die of the plurality of die is excluded from the first zone, the at least one first available erase block excluded from the first zone remaining in the free pool of erase blocks, wherein a wear level of the first available erase blocks is uniformly spread after the exclusion of the at least one first available erase block.

15. The method of claim 14, further comprising:

determining two or more of the first available erase blocks have the same estimated age; and excluding an erase block of the two or more first available erase blocks having the same estimated age from the first zone based on an estimated retention of the excluded erase block or a bit error rate of the excluded erase block.

16. The method of claim 14, wherein the two or more of the first available erase blocks selected to form the first zone are removed from a free pool of the two or more dies.

17. The method of claim 14, wherein the at least one first available erase block of the at least one die excluded from the first zone has a greater estimated age or a greater amount of estimated program-erase cycles than the two or more first available erase blocks selected to form the first zone.

18. The method of claim 14, wherein comparing the estimated age of the first available erase block in each of the plurality of dies to one another further comprises comparing a size of the free pool or erase blocks of each of the plurality of dies to one another.

\* \* \* \* \*